(12) United States Patent
Lin

(10) Patent No.: US 12,537,763 B2
(45) Date of Patent: Jan. 27, 2026

(54) PACKET IDENTIFICATION SYSTEM AND PACKET IDENTIFICATION METHOD

(71) Applicant: REALTEK SEMICONDUCTOR CORP., Hsinchu (TW)

(72) Inventor: Chung-Chang Lin, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 18/512,144

(22) Filed: Nov. 17, 2023

(65) Prior Publication Data

US 2024/0314068 A1   Sep. 19, 2024

(30) Foreign Application Priority Data

Mar. 15, 2023  (TW) .................................. 112109461

(51) Int. Cl.
*H04L 45/00*  (2022.01)
*H04L 45/42*  (2022.01)

(52) U.S. Cl.
CPC ............ *H04L 45/566* (2013.01); *H04L 45/42* (2013.01)

(58) Field of Classification Search
CPC .............................. H04L 45/566; H04L 45/42
See application file for complete search history.

(56) References Cited

U.S. PATENT DOCUMENTS

| | | | | |
|---|---|---|---|---|
| 6,700,897 | B1* | 3/2004 | Tzeng | H04L 49/602 370/428 |
| 6,728,255 | B1* | 4/2004 | Tzeng | H04L 49/602 370/428 |
| 10,212,138 | B1* | 2/2019 | Diamant | H04L 9/3234 |
| 2002/0146130 | A1* | 10/2002 | Dellow | H04N 21/462 380/37 |
| 2004/0218528 | A1* | 11/2004 | Shipman | H04L 45/42 370/232 |
| 2010/0332528 | A1* | 12/2010 | Dellow | H04N 21/462 707/769 |

FOREIGN PATENT DOCUMENTS

| | | | | |
|---|---|---|---|---|
| CN | 102014065 A | | 4/2011 | |
| EP | 1241873 A1 | * | 9/2002 | ......... H04N 21/4334 |

* cited by examiner

*Primary Examiner* — Chris Parry
*Assistant Examiner* — Dixon F Dabipi
(74) *Attorney, Agent, or Firm* — Li & Cai Intellectual Property (USA) Office

(57) ABSTRACT

A packet identification system and a packet identification method are provided. The packet identification system receives a target packet, and includes a first packet header analyzer, a host, and a second packet header analyzer. The first packet header analyzer is configured to preset a plurality of first packet header formats, and identifies whether or not the target packet is one of a plurality of first packet types according to the first packet header formats. The host is configured to dynamically set at least one second packet header format. The second packet header analyzer is communicatively connected to the host. The second packet header analyzer is configured to store the at least one second packet header format, and identifies whether or not the target packet is at least one second packet type according to the at least one second packet header format.

10 Claims, 3 Drawing Sheets

PACKET IDENTIFICATION SYSTEM AND PACKET IDENTIFICATION METHOD

CROSS-REFERENCE TO RELATED PATENT APPLICATION

This application claims the benefit of priority to Taiwan Patent Application No. 112109461, filed on Mar. 15, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a packet identification system and a packet identification method, and more particularly to a packet identification system and a packet identification method in which a host dynamically sets a packet header format that needs to be newly added for identifying a newly-added packet type.

BACKGROUND OF THE DISCLOSURE

Most receivers of various communication technologies include a built-in packet identification system, so as to identify packet types through analyzing packet header formats. With continuous evolution of communication specifications, there is also a steady increase in the number of different packet types, such that the packet identification system often needs to expand packet identification capacity in response to newly-added packet types. However, most existing packet identification systems are implemented by a fixed hardware, and it is necessary to preset the packet header formats of the packet types that are to be identified. As a result, when a newly-added packet type is received, the existing packet identification system will face the problem of not being able to expand the packet identification capacity in real time. Further, the existing packet identification system may also need to perform hardware updates in response to the newly-added packet type, thereby increasing a circuit area and costs of the packet identification system.

SUMMARY OF THE DISCLOSURE

In response to the above-referenced technical inadequacies, the present disclosure provides a packet identification system and a packet identification method in which a host dynamically sets a packet header format that needs to be newly added for identifying a newly-added packet type.

In order to solve the above-mentioned problems, one of the technical aspects adopted by the present disclosure is to provide a packet identification system for receiving a target packet. The packet identification system includes a first packet header analyzer, a host, and a second packet header analyzer. The first packet header analyzer is configured to preset a plurality of first packet header formats, and identifies whether or not the target packet is one of a plurality of first packet types according to the first packet header formats. The first packet header formats respectively correspond to the first packet types. The host is communicatively connected to the first packet header analyzer, and is configured to dynamically set at least one second packet header format. The second packet header analyzer is communicatively connected to the host. The second packet header analyzer is configured to store the at least one second packet header format, and identifies whether or not the target packet is at least one second packet type according to the at least one second packet header format. The at least one second packet header format corresponds to the at least one second packet type.

In order to solve the above-mentioned problems, another one of the technical aspects adopted by the present disclosure is to provide a packet identification method applicable for a packet identification system. The packet identification system includes a first packet header analyzer, a host, and a second packet header analyzer. The first packet header analyzer and the second packet header analyzer are communicatively connected to the host. The packet identification method includes: configuring the first packet header analyzer to preset a plurality of first packet header formats, in which the first packet header formats respectively correspond to a plurality of first packet types; configuring the host to dynamically set at least one second packet header format; configuring the second packet header analyzer to store the at least one second packet header format, in which the at least one second packet header format corresponds to at least one second packet type; receiving a target packet; identifying, according to the first packet header formats, whether or not the target packet is one of the first packet types by use of the first packet header analyzer; and identifying, according to the at least one second packet header format, whether or not the target packet is the at least one second packet type by use of the second packet header analyzer.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
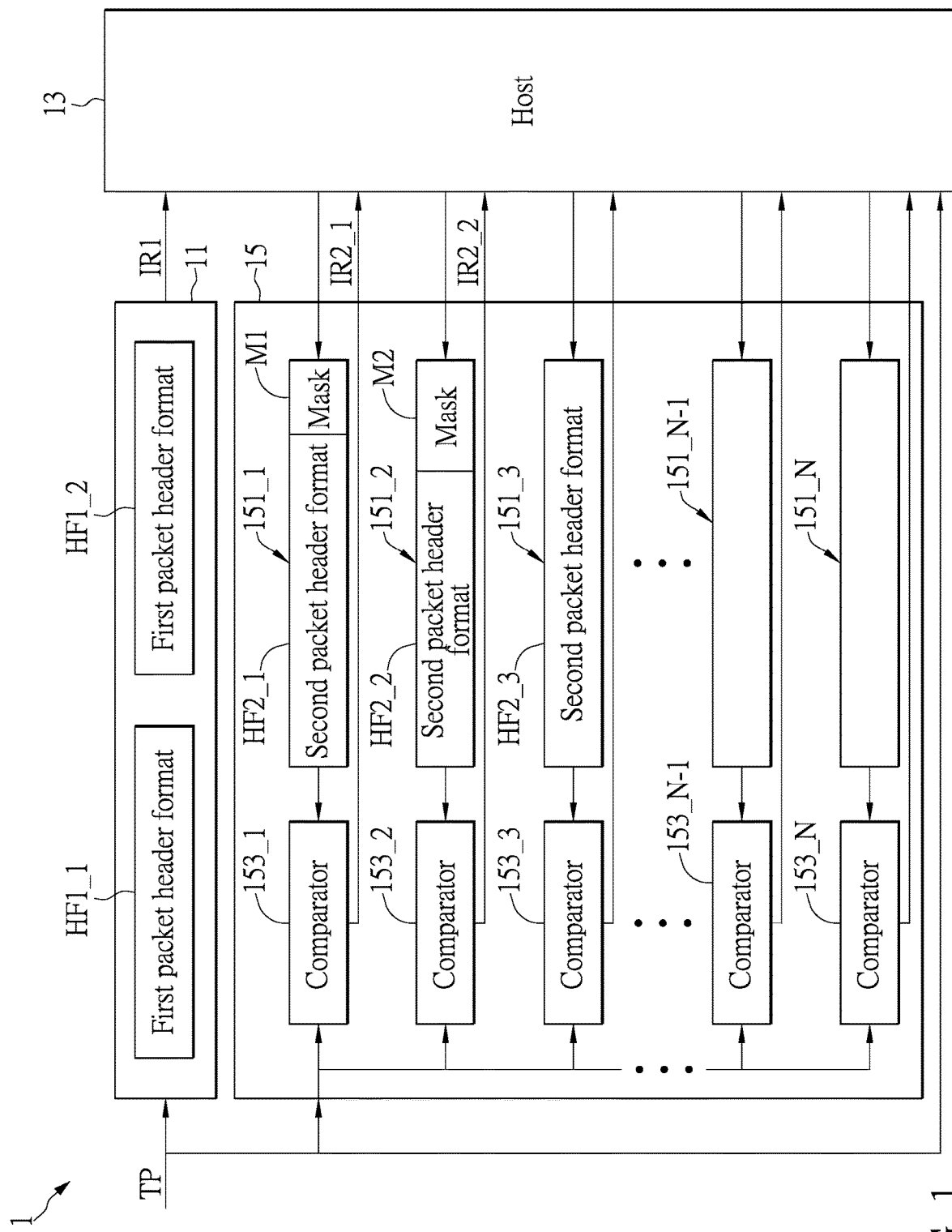
FIG. 1 is a schematic diagram of a packet identification system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a schematic diagram of a packet identification system according to one embodiment of the present disclosure. As shown in FIG. 1, a packet identification system 1 receives a target packet TP, and includes a first packet header analyzer 11, a host 13, and a second packet header analyzer 15. The first packet header analyzer 11 is configured to preset a plurality of first packet header formats, and identifies whether or not the target packet TP is one of a plurality of first packet types according to the first packet header formats. The first packet header formats respectively correspond to the first packet types.

For example, the first packet header analyzer 11 can be configured to preset two first packet header formats HF1_1, HF1_2 that respectively correspond to two first packet types PT1_1, PT1_2. However, the two first packet types PT1_1, PT1_2 are not illustrated in FIG. 1. According to the first packet header formats HF1_1, HF1_2, the first packet header analyzer 11 identifies whether or not the target packet TP is one of the first packet types PT1_1, PT1_2. In the present embodiment, the first packet header analyzer 11 can further generate and output a first identification result IR1 to the host 13.

Specifically, the first packet types PT1_1, PT1_2 are packet types that are known to an existing packet identification system (hereinafter referred to as known packet types for short), and the first packet header formats HF1_1, HF1_2 are packet header formats of the above-mentioned known packet types (hereinafter referred to as known packet header formats for short). As such, the first packet header analyzer 11 can be implemented by a fixed hardware, and the known packet header formats are preset for identifying the known packet types. However, specific ways to implement the first packet header analyzer 11 are not limited in the present disclosure.

On the other hand, the host 13 is communicatively connected to the first packet header analyzer 11, and is configured to dynamically set at least one second packet header format. In the present embodiment, the host 13 can be a remote or local processor. However, specific ways of implementing the host 13 are also not limited in the present disclosure. In addition, the second packet header analyzer 15 is communicatively connected to the host 13. The second packet header analyzer 15 is configured to store the at least one second packet header format, and identifies whether or not the target packet TP is at least one second packet type according to the at least one second packet header format. The at least one second packet header format corresponds to the at least one second packet type.

Further, the second packet header analyzer 15 can include a plurality of registers 151_1 to 151_N and a plurality of comparators 153_1 to 153_N. Here, N is an integer greater than 1. The registers 151_1 to 151_N are communicatively connected to the host 13, and are used to store the at least one second packet header format that is dynamically set by the host 13. The comparators 153_1 to 153_N are respectively connected to the registers 151_1 to 151_N, and are used to compare a target packet header format of the target packet TP with the at least one second packet header format, so as to identify whether or not the target packet TP is the at least one second packet type.

It should be noted that, in response to a quantity of the at least one second packet header format mentioned above being more than one, the second packet header formats respectively correspond to multiple ones of the second packet type, and the second packet header formats are respectively stored in the registers 151_1 to 151_N. In addition, in response to a connected register storing one of the second packet header formats, each comparator of the second packet header analyzer 15 is activated to compare the target packet header format of the target packet TP with the second packet header format for generating and outputting a corresponding second identification result to the host 13.

For convenience of description, in the present embodiment, the second packet header analyzer 15 is exemplified to store two second packet header formats HF2_1, HF2_2 that respectively correspond to two second packet types PT2_1, PT2_2. However, the two second packet types PT2_1, PT2_2 are not illustrated in FIG. 1, and the second packet header formats HF2_1, HF2_2 are respectively stored in the registers 151_1, 151_2. Accordingly, the comparator 153_1 can be activated to compare the target packet header format of the target packet TP with the second packet header format HF2_1 for generating and outputting a corresponding second identification result IR2_1 to the host 13.

Similarly, the comparator 153_2 can be activated to compare the target packet header format of the target packet TP with the second packet header format HF2_2 for generating and outputting a corresponding second identification result IR2_2 to the host 13. In this way, the second packet header analyzer 15 of the present embodiment can be used to identify, according to the second packet header formats HF2_1, HF2_2, whether or not the target packet TP is one of the second packet types PT2_1, PT2_2, and to generate and output the second identification results IR2_1, IR2_2 to the host 13.

Specifically, the second packet types PT2_1, PT2_2 are newly-added packet types, and the second packet header formats HF2_1, HF2_2 are packet header formats of the above-mentioned newly-added packet types (hereinafter referred to as newly-added packet header formats for short). As such, in response to the packet identification system 1 needing to identify one newly-added packet type, the host 13 is configured to set one newly-added packet header format as one of the second packet header formats to be stored in one of the registers, and to activate the comparator connected to the above-mentioned register for comparing the target packet header format with the newly-added packet header format.

On the other hand, each of the second packet header formats can be a bit sequence. In response to a length of the bit sequence being less than a storage space of the register in which the bit sequence is stored, the host 13 is further configured to set a corresponding mask according to the length of the bit sequence (i.e., the second packet header format) and the storage space. In the present embodiment, the host 13 obtains a length of the corresponding mask by subtracting the length of the second packet header format from the storage space, and the second packet header format and the corresponding mask are stored in one register. As shown in FIG. 1, the host 13 can set a mask M1 according to a length of the second packet header format HF2_1 and the storage space, and the second packet header format HF2_1 and the mask M1 are stored in the register 151_1. Similarly, the host 13 can set a mask M2 according to a length of the second packet header format HF2_2 and the storage space, and the second packet header format HF2_2 and the mask M2 are stored in the register 151_2.

Further, if the second packet header format HF2_1 is a sequence of twelve bits, and a length of the mask M1 is three bits, the comparator 153_1 will compare first twelve bits of the target packet header format with the second packet header format HF2_1. Similarly, if the second packet header format HF2_2 is a bit sequence of ten bits, and a length of the mask M2 is five bits, the comparator 153_2 will compare first ten bits of the target packet header format with the second packet header format HF2_2. In other words, the mask of the present embodiment is used to mask a sequence range on which comparison does not need to be performed, so as to prevent erroneous identification caused by comparing bit sequences of different lengths.

It can be known from the above description that the host 13 receives a packet identification result (which includes the first identification result IR1 generated by the first packet header analyzer 11 and one or more second identification results generated by the second packet header analyzer 15), and can be used to set the second packet header analyzer 15 according to practical requirements. In the present embodiment, the host 13 can also directly receive the target packet TP. After the first packet header analyzer 11 identifies that the target packet TP is not one of the first packet types PT1_1, PT1_2, and the second packet header analyzer 15 identifies that the target packet TP is not one of the second packet types PT2_1, PT2_2, the host 13 can directly perform packet identification on the target packet TP.

After the host 13 completes the packet identification of the target packet TP, the host 13 can set the target packet header format of the target packet TP as another one of the second packet header formats to be stored in another one of the registers (e.g., a second packet header format HF2_3 is stored in the register 151_3), and activate the comparator 153_3 connected to the register 151_3. Accordingly, when the packet identification system 1 receives a new target packet TP, the second packet header analyzer 15 can compare a target packet header format of the new target packet TP with the second packet header format HF2_3 through the register 151_3 and the comparator 153_3, so as to identify whether or not the new target packet TP is a second packet type PT2_3 that corresponds to the second packet header format HF2_3. However, the second packet type PT2_3 is also not illustrated in FIG. 1.

Only when the first packet header analyzer 11 and the second packet header analyzer 15 both cannot identify the target packet TP does the host 13 need to directly perform the packet identification on the target packet TP. Accordingly, the packet identification system 1 can have lower requirements for a computing ability and a computing speed of the host 13. In other words, the host 13 selected in the present disclosure can have a smaller area and less power consumption. As mentioned previously, each of the packet header formats can be a bit sequence. Hence, in the present disclosure, the first packet header analyzer 11 and the second packet header analyzer 15 can be divided into a multi-section architecture, and each section is used to identify a packet header of one small section of the target packet TP.

Figure 2:
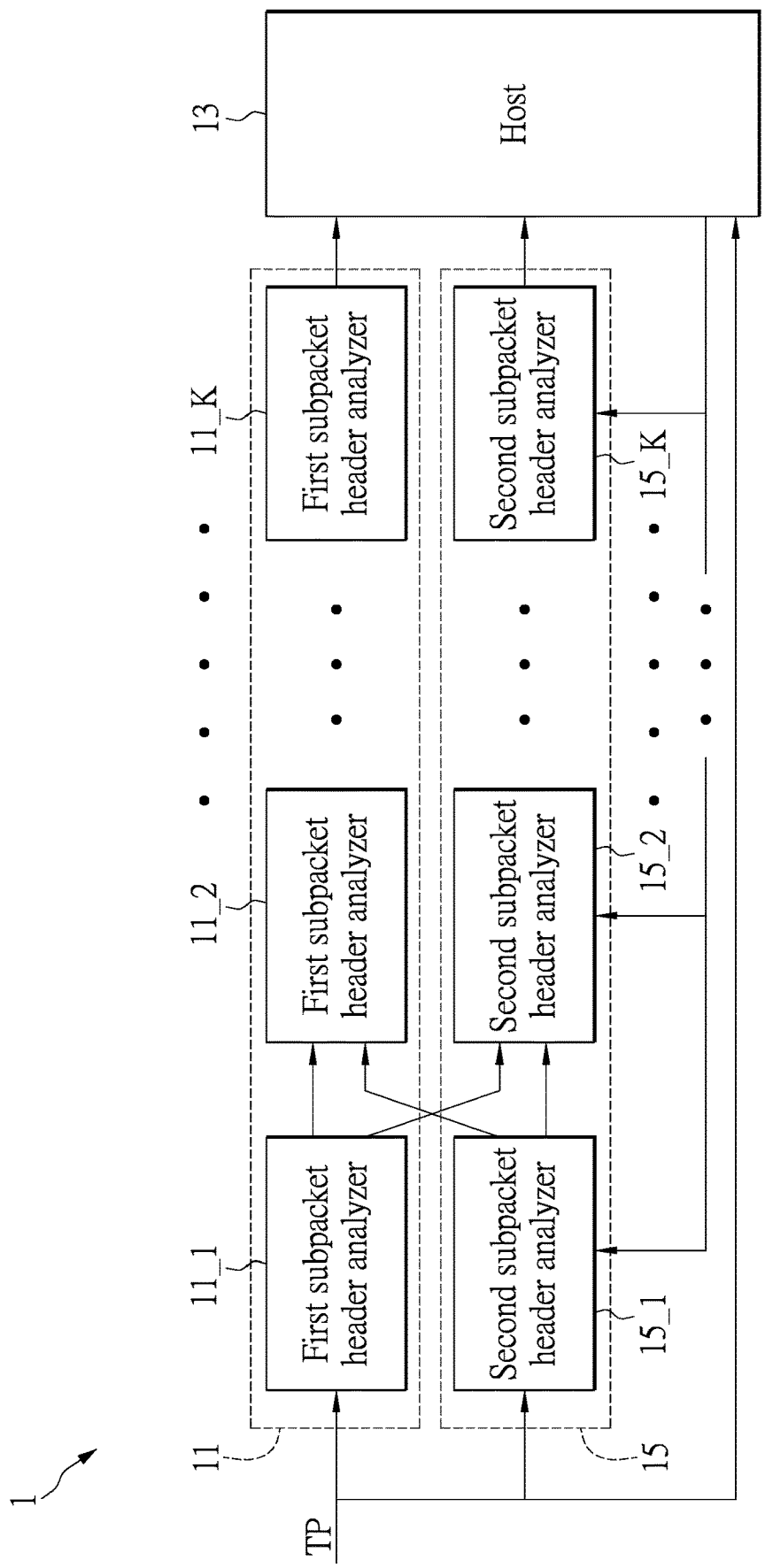
FIG. 2 is a schematic diagram showing a first packet header analyzer and a second packet header analyzer being divided into a multi-section architecture according to one embodiment of the present disclosure.

Reference is made to FIG. 2, which is a schematic diagram showing a first packet header analyzer and a second packet header analyzer being divided into a multi-section architecture according to one embodiment of the present disclosure. As shown in FIG. 2, the first packet header analyzer 11 can be divided into a plurality of first subpacket header analyzers 11_1 to 11_K, and the second packet header analyzer 15 can be divided into a plurality of second subpacket header analyzers 15_1 to 15_K. Here, K is an integer greater than 1. In the present embodiment, each subpacket header analyzer is used to identify a header of one small section of the target packet TP. For example, when a packet header format of a first section of the target packet TP satisfies a second packet header format of a first section of the at least one second packet type, the packet identification system 1 can continue to identify whether or not a packet header format of a second section of the target packet TP satisfies a second packet header format of a second section of the at least one second packet type through the second subpacket header analyzer 15_2 that corresponds to the header of a next section. In this way, a circuit usage rate can be increased and be more flexible. Details related to operation of each subpacket header analyzer are as those described in the previous embodiment, and will not be reiterated herein.

Figure 3:
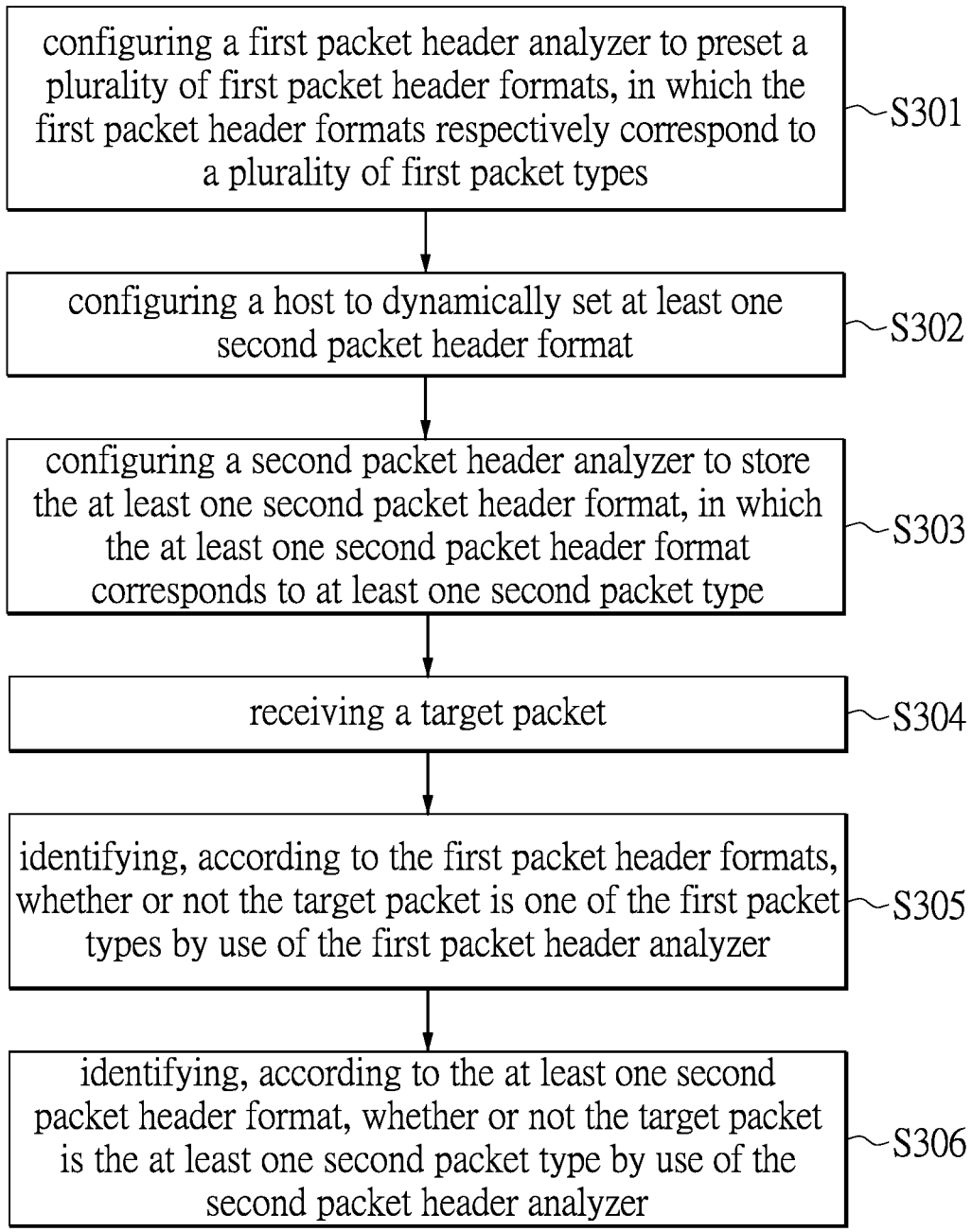
FIG. 3 is a flowchart of a packet identification method according to one embodiment of the present disclosure.

Reference is made to FIG. 3, which is a flowchart of a packet identification method according to one embodiment of the present disclosure. Since the packet identification method of FIG. 3 is applicable for the packet identification system 1 of FIG. 1, FIG. 3 is to be read in conjunction with FIG. 1. As shown in FIG. 3, the packet identification method includes the following steps.

Step S301: configuring the first packet header analyzer 11 to preset the first packet header formats, in which the first packet header formats respectively correspond to the first packet types. For example, the first packet header analyzer 11 is configured to preset the two first packet header formats HF1_1, HF1_2 that respectively correspond to the two first packet types PT1_1, PT1_2.

Step S302: configuring the host 13 to dynamically set the at least one second packet header format.

Step S303: configuring the second packet header analyzer 15 to store the at least one second packet header format, in which the at least one second packet header format corresponds to the at least one second packet type. For example, the second packet header analyzer 15 is configured to store the two second packet header formats HF2_1, HF2_2 that respectively correspond to the two second packet types PT2_1, PT2_2.

Step S304: receiving the target packet TP. In the present embodiment, the first packet header analyzer 11, the host 13, and the second packet header analyzer 15 of the packet identification system 1 can all receive the target packet TP.

Step S305: identifying, according to the first packet header formats, whether or not the target packet TP is one of the first packet types by use of the first packet header analyzer 11. In the present embodiment, the first packet header analyzer 11 can further generate and output the first identification result IR1 to the host 13.

Step S306: identifying, according to the at least one second packet header format, whether or not the target packet TP is the at least one second packet type by use of the second packet header analyzer 15. In the present embodiment, the second packet header analyzer 15 can further generate and output the one or more second identification results to the host 13. For example, in response to the at least one second packet header format mentioned above including the second packet header formats HF2_1, HF2_2, the second packet header analyzer 15 can further generate and output the second identification results IR2_1, IR2_2 to the host 13. Relevant details are as described previously, and will not be reiterated herein.

Beneficial Effects of the Embodiments

In conclusion, in the packet identification system and the packet identification method provided by the present disclosure, the host dynamically sets the packet header format that needs to be newly added for identifying the newly-added packet type. As such, packet identification capacity can be expanded in real time. In addition, the host dynamically sets the newly-added packet header format to be stored in the register of the second packet header analyzer, and activates the comparator connected to the register for comparing the target packet header format of the target packet with the newly-added packet header format. In this way, a circuit area and costs can be significantly decreased at the same time.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A packet identification system for receiving a target packet, the packet identification system comprising:
a first packet header analyzer, wherein the first packet header analyzer is configured to preset a plurality of first packet header formats, and identifies whether or not the target packet is one of a plurality of first packet types according to the first packet header formats; wherein the first packet header formats respectively correspond to the first packet types;
a host communicatively connected to the first packet header analyzer, wherein the host is configured to newly set at least one second packet header format, wherein, in response to the packet identification system needing to identify a newly-added packet type, the host is configured to set a newly-added packet header format as one of the second packet header formats to be stored in one of registers; and
a second packet header analyzer communicatively connected to the host, wherein the second packet header analyzer is configured to store the at least one second packet header format, and identifies whether or not the target packet is at least one second packet type according to the at least one second packet header format; wherein the at least one second packet header format corresponds to the at least one second packet type;
wherein, when a new target packet is received by the packet identification system, the second packet header analyzer compares a new target packet header format of the new target packet with the at least one second packet header format through the register and a comparator so as to identify whether or not the new target packet is one of the at least one second packet type that corresponds to one of the at least one second packet header format; and the packet identification system directly performs packet identification on the new target packet if the new target packet is not any of the at least one second packet type stored in the register.

2. The packet identification system according to claim 1, wherein the second packet header analyzer includes:
a plurality of registers communicatively connected to the host, wherein the registers are used to store the at least one second packet header format that is newly set by the host; and
a plurality of comparators, wherein the comparators are respectively connected to the registers, and are used to compare a target packet header format of the target packet with the at least one second packet header format, so as to identify whether or not the target packet is the at least one second packet type.

3. The packet identification system according to claim 2, wherein, in response to a quantity of the at least one second packet header format being more than one, the second packet header formats respectively correspond to multiple ones of the second packet type, and the second packet header formats are respectively stored in the registers.

4. The packet identification system according to claim 3, wherein the first packet header analyzer further generates and outputs a first identification result to the host; wherein, in response to the connected register storing one of the second packet header formats, each of the comparators of the second packet header analyzer is activated to compare the target packet header format with the second packet header format for generating and outputting a corresponding second identification result to the host.

5. The packet identification system according to claim 3, wherein each of the second packet header formats is a bit sequence; wherein, in response to a length of the bit sequence being less than a storage space of the register in which the bit sequence is stored, the host is further configured to set a corresponding mask according to the length of the bit sequence and the storage space.

6. A packet identification method applicable for a packet identification system, wherein the packet identification system includes a host, a first packet header analyzer, and a second packet header analyzer, and the first packet header analyzer and the second packet header analyzer are communicatively connected to the host, the packet identification method comprising:
configuring the first packet header analyzer to preset a plurality of first packet header formats, wherein the first packet header formats respectively correspond to a plurality of first packet types;
configuring the host to newly set at least one second packet header format, wherein, in response to the packet identification system needing to identify a newly-added packet type, the host is configured to set a newly-added packet header format as one of the second packet header formats to be stored in one of registers;

configuring the second packet header analyzer to store the at least one second packet header format, wherein the at least one second packet header format corresponds to at least one second packet type, wherein, when a new target packet is received by the packet identification system, the second packet header analyzer compares a new target packet header format of the new target packet with the at least one second packet header format through the register and a comparator so as to identify whether or not the new target packet is one of the at least one second packet type that corresponds to one of the at least one second packet header format; and the packet identification system directly performs packet identification on the new target packet if the new target packet is not any of the at least one second packet type stored in the register;

receiving a target packet when the host newly sets the at least one second packet header format;

identifying, according to the first packet header formats, whether or not the target packet is one of the first packet types by use of the first packet header analyzer; and identifying, according to the at least one second packet header format, whether or not the target packet is the at least one second packet type by use of the second packet header analyzer.

7. The packet identification method according to claim 6, wherein the second packet header analyzer includes:

a plurality of registers communicatively connected to the host, wherein the registers are used to store the at least one second packet header format that is newly set by the host; and a plurality of comparators, wherein the comparators are respectively connected to the registers, and are used to compare a target packet header format of the target packet with the at least one second packet header format, so as to identify whether or not the target packet is the at least one second packet type.

8. The packet identification method according to claim 7, wherein, in response to a quantity of the at least one second packet header format being more than one, the second packet header formats respectively correspond to multiple ones of the second packet type, and the second packet header formats are respectively stored in the registers.

9. The packet identification method according to claim 8, wherein the first packet header analyzer further generates and outputs a first identification result to the host; wherein, in response to the connected register storing one of the second packet header formats, each of the comparators of the second packet header analyzer is activated to compare the target packet header format with the second packet header format for generating and outputting a corresponding second identification result to the host.

10. The packet identification method according to claim 8, wherein each of the second packet header formats is a bit sequence; wherein, in response to a length of the bit sequence being less than a storage space of the register in which the bit sequence is stored, the host is further configured to set a corresponding mask according to the length of the bit sequence and the storage space.

\* \* \* \* \*